United States Patent [19]

Black, Jr. et al.

[11] Patent Number: 4,865,738
[45] Date of Patent: Sep. 12, 1989

[54] FILTER CARTRIDGE WITH TRUNCATED SAWTOOTH PROJECTION ASSEMBLY

[75] Inventors: John J. Black, Jr., Canton; Harold A. Lamb, III, Torrington, both of Conn.

[73] Assignee: Cuno, Incorporated, Meriden, Conn.

[21] Appl. No.: 128,125

[22] Filed: Dec. 3, 1987

[51] Int. Cl.⁴ ............................................ B01D 27/08
[52] U.S. Cl. .................... 210/484; 210/485; 210/489; 55/492; 55/500; 55/503; 156/556; 156/578
[58] Field of Search .............. 210/435, 446, 457, 458, 210/483, 484, 485, 493.1, 493.2, 493.4, 497.01, 497.2, 489; 55/492, 500, 503; 156/552, 556, 578

[56] References Cited

U.S. PATENT DOCUMENTS

| | | | |
|---|---|---|---|
| 3,486,626 | 12/1969 | Close | 210/485 |
| 4,104,170 | 8/1978 | Nedza | 210/493.2 |
| 4,301,012 | 11/1981 | Puckett | 210/493.1 |
| 4,505,816 | 3/1985 | Wozniak et al. | 210/484 |
| 4,521,309 | 6/1985 | Pall | 210/493.2 |
| 4,536,291 | 8/1985 | Hoffman et al. | 210/484 |
| 4,609,465 | 9/1986 | Miller | 210/484 |
| 4,618,422 | 10/1986 | Sasaki et al. | 210/485 |
| 4,680,118 | 7/1987 | Taga | 210/493.1 |

*Primary Examiner*—Richard V. Fisher
*Assistant Examiner*—Wanda L. Millard
*Attorney, Agent, or Firm*—Weingram & Zall

[57] ABSTRACT

A filter cartridge having an improved end cap and tube support design is taught. Briefly stated, an outer cage has circumferentially disposed thereround a plurality of truncated triangular shaped saw tooth-like projections each of which as a rounded nub or projection at the outermost truncated end. An inner cage similarly has a plurality of alternating projections coextensive therewith, with the thickness of the furthermost portion of the projection being tapered towards the bottom where the projection meets the end of the inner cage. The inner cage is disposed within the outer cage and placed between end caps having circumferential regions adapted to receive the projections disposed at the end of the outer and inner cage respectively. A filtration medium is disposed between the inner and outer cage.

9 Claims, 2 Drawing Sheets

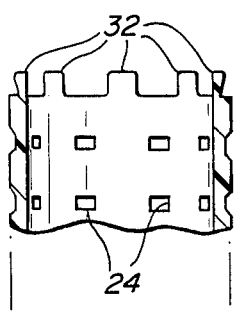
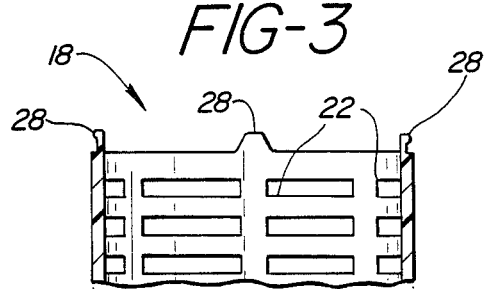
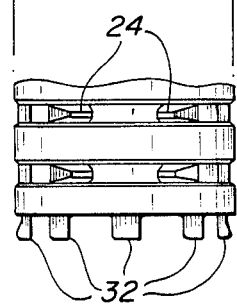
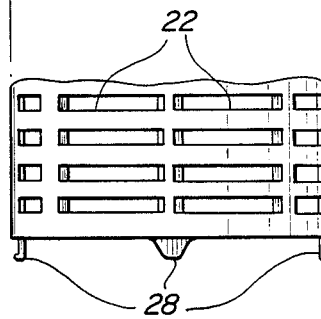

FILTER CARTRIDGE WITH TRUNCATED SAWTOOTH PROJECTION ASSEMBLY

BACKGROUND OF THE INVENTION

1. Field of the Invention

This invention relates, generally, to filter cartridges and more particularly to an improved end cap and tube support design for forming a more secure and reliable seal therebetween.

2. Description of the Prior Art

Filter-type cartridges have been used for a significant period of time. The advantages of these types of cartridges are many, with ease of filter change-out being foremost. However, while their ease of use is a great advantage, it is difficult to economically manufacture high quality cartridges.

These types of cartridges are generally tubular in shape, having an inner and outer core or support with a filtration medium disposed therebetween. The filters may be manufactured so as to have the filtered material enter from either end or both ends, exiting through the side walls of the filter cartridge (or vice versa). The filtration medium itself is generally a corrugated fibrous product or a polymer membrane such as a nylon microporous membrane, which is relatively weak from a structural standpoint. Attempts to make the filtration media more structurally stable have a tendency to decrease the filtration capaity of the medium. Therefore supports adjacent to the filtration medium are obviously necessary.

These cage or support portions, in addition to providing structural protection and support for the filtration medium, also allow the cartridge-type assembly to be subjected to substantial forces external to the material being filtered. These forces may be in the nature of vibration, and, in particular, thermal expansion and contraction during sterilization and use as well as direct shock from adjacent components or during installation.

Throughout all this, it is necessary that the filtration medium be securely positioned between the inner and outer cage. It is equally important that the ends be securely attached at the end of the cage portions. While in most situations appropriate gluing or heat sealing of the end cap to the cage portion is not problematic, this technology is severely restricted in the filter cartridge art. The reasons for these restrictions are that excessive heating or use of adhesives may damage or contaminate the cartridge. Additionally, since many applications are for use in sterile and non-toxic areas, certain glues and adhesives as well as methods of attachment are not acceptable.

Further, any failures or structural integrity problems in the end region will deteriorate this region and may result in separation between the end cap and the cage such that unfiltered material will be mixed with filtered material. This occurrence, in any amount, is unacceptable in all circumstances.

Performing all of the above functions has proven to be even more difficult when manufacturing cost considerations are factored in. However, it has been found that proper interconnection between the end portion of the inner and outer cage and the end cap through proper design obviates separation.

There have been numerous attempts at this type of mechanical fix. One such solution may be found in U.S. Pat. No. 4,521,309 "Filter Cartridge with Castellated Support and Process of Making the Same" issued to Pall on June 4, 1985 and which is incorporated by reference herein. The Pall reference utilizes equally spaced castellated end portions at the end of the cage portions. The castellated configuration allows for the recessed portions to have reentrant sides so as to basically form an inverted triangle with one corner of the triangle being fixed to the end of the cage. However, it has been found that this configuration has a number of drawbacks. There, the inner and outer cages utilize the same castellated configuration. These castellations or "inverted triangles" are made to engage specific complimentary formed areas of the end cap. Therefore, it is inevitable that the castellated portion; the conforming portion in the end cap; or both, must first compress or expand respectively, in order to be mated. Further, due to the relative small surface area of the castellations, adequate bonding between the end caps and either cage is only minimal at best. Therefore, by design, the configuration as utilized in the Pall reference inherently leaves room for movement and separation between the end cap and the cage and still relies heavily on the mechanical bond formed by glue, melting of the materials, or the like, between the end cap and the inner and outer cage. Melting is the preferred method described in Pall and is accomplished by melting the end cap before it is placed onto the cartridge. This is necessary due to the inherent weakness in the Pall design with respect to separating the end cap from the cartridge in the axial direction.

SUMMARY AND OBJECTS OF THE PRESENT INVENTION

The present invention provides a filter cartridge comprising a pleated filtration material disposed in a tube opened at at least one end thereof; a support having a substantially closed circumferential configuration disposed in supporting relation to and substantially coextensive with said filtration medium, said support supporting the filtration medium; said support having at least one end at the open end of said circumferential opening formed in a sawtooth configuration, each said sawtooth having a raised portion and a recessed portion along said circumferential opening, and wherein said raised portion has a semicircular projection along a portion thereof; and at least one end cap attached to and extending across the open end of said circumferential opening, said end cap having at least one portion therein profiled so as to receive each said sawtooth projection.

Accordingly, it is an object of the present invention to provide a filter cartridge having cage and end cap portions which allow for an extremely secure connection between the ends of the cage and the end cap.

It is another object of the present invention to provide a means of interconnection between the cage and the end cap which is inexpensive to manufacture and assemble and which minimizes the need for high strength glues and adhesives to provide bonding between the ends of the cage and the end cap.

Further, the present invention has an advantage of greatly enhanced resistance to pulling and separation of the end caps in the cartridge.

It is still another object of the present invention and advantage to eliminate rotation of the end cap with respect to the cartridge through a mechanical interconnection.

Another object of the present invention and an advantage is to provide additional material mating area for contact between the end cap and the ends of the cage thereby requiring significantly larger displacement between the tube before the inner core can be separated from the end in view of prior methods.

Further, it has been found that not only is the configuration of the end cap in relation to the ends of the outer and inner cage important, but the volume of surface area of the mating portions is also critical. Therefore, it has been found to be advantageous and it is an object of the present invention to provide mating surfaces which offer a significant or large surface area.

These as well as other objects and advantages will be apparent from the description of the invention and the novel features will be particularly pointed out hereinafter in the claims.

BRIEF DESCRIPTION OF THE DRAWINGS

Reference may be now had to the accompanying drawings in which:

FIG. 2 is a side view, partially in section, of the inner cage of the filter cartridge of the present invention showing the retainer portions thereof;

FIG. 3 is a side view, partially in section, of the outer cage of the filter cartridge of the present invention showing the retainer portions thereof;

DESCRIPTION OF THE PREFERRED EMBODIMENT

Figure 1:
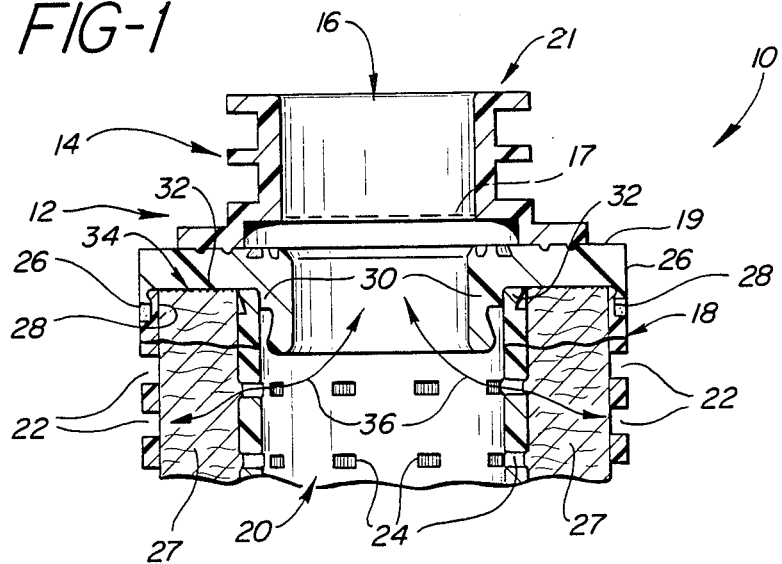
FIG. 1 is a longitudinal cross-sectional view taken through a filter cartridge utilizing the interconnection aspects of the present invention.

Referring now to FIG. 1, there is shown a longitudinal cross-section taken through a filter cartridge assembly shown generally at 10 and illustrating the preferred embodiment of the present invention. The filter cartridge assembly 10 has disposed at either end an end assembly shown generally at 12. The end assembly 12 may have a screw-type base or preferably reciprocal-type grooves shown generally at 19. The material to be filtered may be entered or exited through the end area shown generally at 16. An end area 16 may be disposed at each end assembly 12 or may be disposed at only one end.

If only one end area 16 is used, the remaining end would be closed off so as to provide a closed end assembly as shown generally by dotted line 17. Therefore, the end assembly 12 may have an end cap 19 with two different types of upper or ring connector portions available which engage the end cap 19. The upper or ring connector areas may therefore be an upper portion shown generally at 21 which utilizes an end area 16 or may simply be a closed end assembly shown generally by dashed line 17. In this manner, the end cap 19 of the end assembly may be used with a plurality of different ring connectors, such as but not limited to 17 or 21.

An outer cage shown generally at 18 is concentrically disposed around an inner cage shown generally at 20. Outer and inner apertures 22, 24 are respectively disposed in the outer and inner cages 18, 20. This therefore permits the material or substance to be filtered, illustrated by numeral 36, to enter or exit end area 16 and flow through the outer and inner apertures 22, 24. Disposed between the outer and inner cages 18, 20 is filtration medium 27. The filtration medium 27, which is preferably pleated, may be comprised of any desired configuration or substance which is compatible with that of the substance to be filtered, taking into account the flow rate, size of the overall filter cartridge assembly 10 and the like.

It is preferred that the end assembly 12, outer cage 18 and inner cage 20 are formed from a thermoplastic resin, which is preferably polyethylene or polypropylene, although it is to be understood that any other suitable material may be utilized such as other plastics or resins which are compatible with the environment in which they are to be used. The end cap 19 has circumferentially disposed thereround an end cap outside ring 26 which engages and mates with an outer cage retainer portion 28 contained at the end of the outer cage 18. The end assembly 12 also has an end cap inner ring shown generally at 30 which engages the inner cage retainer portion 32 of the inner cage 20. A bonding or joint area is shown generally at 34 and illustrates the point at which inner cage 20 and outer cage 18 are respectively bonded to the inner cage retainer portion and outer cage retainer portion. This bonding or joint area may be filled with thermoplastic resins, glues or the like, or may be the area for a mechanical joint between respective surfaces following heating and appropriate melting of the end assembly 12, and/or the outer cage retainer portion 28 and/or the appropriate portion of the inner cage retainer portion 32.

During assembly, an end assembly 12 having the appropriate ring connector 17 or 21 would be chosen for each end of the filter cartridge assembly 10. Preferably, the inner cage 20 would therefore be placed between the respective end assemblies 12, followed by the filtration medium and the outer cage 18. Heat may, if desired, then be applied so as to melt the appropriate end regions of the inner and outer cages 18, 20 and preferably end assembly 12 so as to form a bond or joint at area 34. However, it is to be understood that alternate means of joining the end assembly 12 to the outer and inner cages 18, 20 may be utilized such as glues and the like which would then be injected into the appropriate areas at the time of or just prior to assembly of the various components. It is also envisioned that certain types of glues may be utilized which must be heat activated after complete assembly of the filter cartridge assembly 10.

Figure 5A:
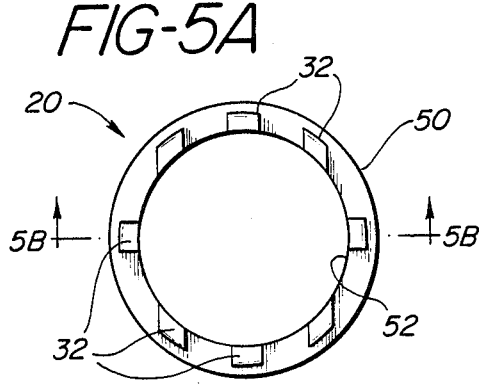
FIGS. 5A and 5B illustrate the retainer portion of the inner cage.
Figure 5B:
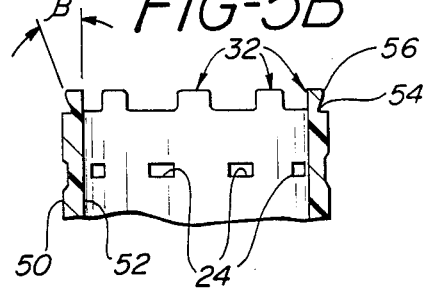

Referring now to FIG. 2, there is shown a longitudinal view of the inner cage 20. Evident is the inner apertures 24 which allow for passage of the substance which has been filtered (not shown). At either end of the inner cage 20 are the inner cage retainer portions 32. Referring to FIGS. 5A and 5B there can be seen more detailed top and side views of the inner cage retainer portions 32. The number of retainer portions 32 disposed circumferentially around the inner cage 20 may vary according to the size, structural or pressure requirements of the filter but will preferably be uniformly spaced so as to form a ring of eight retainer portions 32. The inner cage retainer portions 32 form an alternating pattern when viewed straight on at the end of the inner cage 20. However, when viewed from the side, it can readily be seen that the inner face 52 of the inner cage 20 extends upwards so as to form the back portion of the inner cage retainer portion 32, while the outer face 50 of inner cage 20 when extending beyond the end of the inner cage 20 forms a recessed groove 54 thereby forming an inner cage retainer portion projection or nub 56. The angle between the inner cage outer face 50 and the inclination of recessed groove 54 as designated B (beta)

is preferably greater than 0° and no greater than 90° and preferably in the range of 30°. Therefore, the inner cage retainer projection 56 will engage the end cap inner ring 30.

It is to be understood that the inner cage retainer portions may number fewer or greater than those designated and may even form a contiguous circumferential retainer along the circumference of the inner cage 20. Additionally, it is envisioned that the inner cage retainer portion 32 may essentially be reversed such that the recessed groove 54 and inner cage retainer projection 56 would face the interior of the inner cage 20. It is also envisioned that the inner cage retainer portions 32 may alternate in this fashion in any desired sequence so that the recessed groove and inner cage retainer projections 54, 56 of one inner cage retainer portion 32 would face the interior while the adjacent or any other subsequent inner cage retainer portion would face outward as shown in FIG. 5B. Similarly, the appropriate areas of end cap 19 would be so molded so as to accept this configuration. Therefore, it is possible to "key" the inner cage 20 so as to be specifically oriented with respect to any other component of the filter cartridge assembly 10. Also, projection 56 adds surface area to the inner cage retainer portion 32 thereby aiding in attachment to the end assembly 12.

Figure 4A:
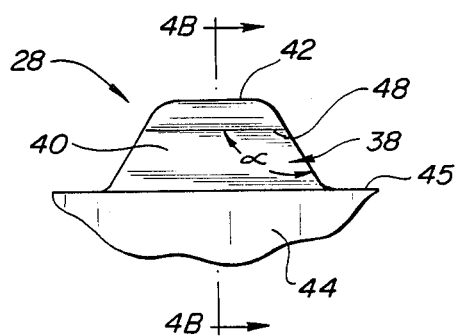
FIGS. 4A and 4B illustrate retainer portions of the outer cage.
Figure 4B:
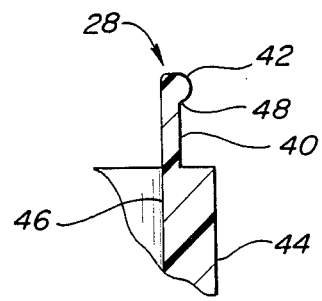

Referring now to FIG. 3, there is shown a longitudinal view of an outer cage. Here it can be seen how the outer apertures 22 are configured as well as the orientation of the outer cage retainer portions 28. FIGS. 4A and 4B show in more detail the configuration and orientation of the outer cage retainer portions 28. The outer cage retainer portion 28 is generally comprised of a tab portion 38 having a tab site area 40 and a cylindrical or semi-circular projection or nub shown generally at 42. The tab portion 38 is wider at the base where it meets the outer cage end surface or edge 45 and tapers as it approaches towards the projection 42. Therefore, this forms an angle α (alpha) defined as the angle formed between the truncated outer end of the projection 42 and the line formed by the tab site area 40. This angle α (alpha) is at least 90°, preferably less than 150° and ideally 120°, although larger angles are useable. Therefore, the outer cage retainer portion 28 forms a truncated erect triangle configuration which meets with a correspondingly configured area in the end cap assembly (not shown). Disposed at the end of each retainer portion 28 is a projection or nub 42. The projection 42 is formed by having inner face 46 of outer cage 18 extend coextensively therefrom, while the outer face 44 of outer cage 18 is partially truncated as shown in FIG. 4B such that a ridge area 48 is formed. Further, the projection 42 adds surface area to the outer cage retainer portion 32 thereby aiding in attachment to the end assembly 12. It is this ridge area 48 which engages the end cap outside ring 26 of FIG. 1. Therefore, while the truncated configuration of the cap portion 38 provides alignment with respect to the end assembly 12 and prevents rotation or torsional movement of the outer cage 18, with respect to the end assembly 12, the ridge area 48 will engage the mentioned area in the end assembly 12. Further, in a fashion similar to that of the inner cage retainer portion 32, the projection 42 may face the interior or outward. Similarly, the projections 42 may be alternated between interior and exterior facing directions. Also, the outer cage retainer portion 28 may be a single contiguous portion at the end of the outer cage.

It has been found that when tested along side conventional cartridge assemblies the above design and construction perform significantly better. More particularly, several cartridges utilizing the present design were steamed five times for one hour each at a temperature of 145° C. Measurements and visual observations were made before and after every steaming. Simultaneously, cartridges using a prior art core design were similarly tested. The new outer cage design, as described in the present invention, performed extremely well showing little to no separation from the end cap. This is in contrast to the prior art production cages which showed excessive separation. Further, the outer cages displayed no out of roundness while the standard cages typically do become out of round.

After steaming, all the cartridges were cross-sectioned with the result that the newly invented cartridges exhibited a much greater resistance to heat. There was no evidence of the cartridge breaking away from the end cap, clearly indicating that there is a more positive interlock with the end cap.

To assemble the present invention, the preferred method is for heating an inside face of the thermoplastic end cap 19 to a temperature sufficient to soften, and preferably not liquify, a sufficient amount of the end cap 19 to form a thermoplastic seal at each end of cages 18, 20. All the edges of one end of the cage 18,20 are then embedded into the softened end cap 19. The softened end cap 19 material is then hardened, typically by ambient conditions, to form a thermoplastic sealing relationship between the sealing surface of the end cap 19 and cage thereby forming a leak-proof seal.

End caps of thermoplastic materials are preferred because of the ease of bonding, but it is also possible to use thermosetting resins in a thermoplastic, fusable or heat-softenable stage of polymerization, until the bonding has been effected, after which the curing of the resin can be completed to produce a structure which can no longer be separated. Such a structure is autoclaveable without danger of destroying the fluid-tight seal between the housing portions and the filter membrane and the end caps. Thermoplastic resins whose softening point is sufficiently high so that they are not softened under sterilizing autoclaving conditions are preferred for medical use.

It is to be understood that many variations of the present invention may be practised without departing from the spirit and scope of the present invention. For example, the outer cage and inner cage retainer portions may be intermixed such that, for example, the inner cage would have an inner cage retainer portion as shown and described while having adjacent to it an outer cage retainer portion as described. Further, the retainer portions of the inner and outer cages may be centered between the inner and outer faces of the respective inner and outer cage walls or may even alternate so that, for example, an inner cage retainer portion has one surface which is coextensive with the outer face of the inner cage, while the next retainer portion has one surface which is coextensive with the inner face of the outer cage.

Additionally, it is to be understood that the semicircular projections or nubs may be located between the uppermost and lowermost portions of the outer cage retainer portion and may in fact be more narrow than the width of the outer cage retainer portion. Similarly, the inner cage retainer projection on the inner cage may be so located. Further, the cartridge assembly may be in a shape other than tubular such as, for example, triangular, oblong, square or the like. Accordingly, the outer cage retainer portion or inner cage retainer projection would be correspondingly disposed along the circumference of the inner or outer cage. To that extent, it is to be understood that circumference shall be taken to mean the outer periphery or edge of the various parts of the cartridge assembly of the present invention and does not necessarily indicate or limit the cartridge configuration to spherical or tubular.

Accordingly, the present invention describes a filter cartridge assembly which is relatively inexpensive to manufacture and assemble while providing a high degree of reliability thereby lowering costs and improving quality.

It will also be understood that various changes in the details, materials, arrangements or parts and operating conditions which have been herein described and illustrated in order to explain the nature of the invention may be made by those skilled in the art within the principles and the scope of the invention as set forth in the appended claims.

What is claimed is:

1. A filter cartridge, comprising:
   a filtration medium disposed in a tube opened at at least one end thereof;
   a support having a substantially closed circumferential configuration disposed in supporting relation to and substantially coextensive with said filtration medium, said support supporting said filtration medium;
   said support having at least one end opened and formed in a sawtooth-like configuration, having projections, each projection in the form of an upright truncated triangle, and having a circumferential nub along the projection;
   at least one end cap attached to and extending across the open end of said circumferential configuration, said end cap having at least one portion adapted so as to receive each hub; and
   end cap melt material extending into and substantially filling the areas disposed between said projections and surrounding said nub so as to fixedly attach said end cap to said support.

2. A filter cartridge, comprising:
   a filtration medium disposed in a tube opened at at least one end thereof;
   a support having a substantially closed circumferential configuration disposed in supporting relation to and substantially coextensive with said filtration medium, said support supporting said filtration medium;
   said support having at least one end opened and formed in a sawtooth configuration, having projections, each projection in the form of an upright truncated triangle and having a circumferential nub along the projection, each sawtooth having a raised portion and a recessed portion along said circumferential configuration, said recessed portion at least as wide as said raised portion;
   at least one end cap attached to and extending across the open end of said circumferential configuration, said end cap having at least one portion adapted so as to receive each nub; and
   end cap melt material extending into and substantially filling the areas disposed between said sawtooth projections and surrounding said hub so as to fixedly attach said end cap to said support.

3. A filter cartridge, comprising:
   a filtration medium disposed in a tube opened at least one end thereof;
   inner and outer supports having a substantially closed circumferential configuration disposed in supporting relation to and substantially coextensive with said filtration medium, said inner and outer supports each supporting said filtration medium;
   said inner and outer supports each having at least one end opened and formed in a sawtooth-like configuration having projections in the form of an upright truncated triangle, each projection having a circumferential nub along the projection;
   at least one end cap attached to and extending across the open end of said circumferential configuration of said inner and outer supports, said end cap having at least one portion adapted so as to receive each hub of said inner and outer supports; and
   end cap melt material extending into and substantially filling the areas disposed between said sawtooth projections and surrounding said end cap so as to fixedly attached said end cap to said supports.

4. The filter cartridge of claims 1, 2 or 3 wherein the nub is along the top of each projection.

5. A filter cartridge assembly according to claims 1, 2 or 3 wherein the nub faces away from the filtration medium.

6. A filter cartridge according to claims 1, 2 or 3 wherein the nub faces towards the filtration medium.

7. A filter cartridge according to claims 1, 2 or 3 wherein the nub is adjacent the truncated portion of the upright triangle.

8. A filter cartridge according to claim 1, 2 or 3 wherein the sawtooth configuration is contiguously disposed around said circumferential opening.

9. The filter cartridge according to claims 1, 2 or 3 wherein the angle between the truncated portion of said triangle and an adjacent side is in the range of 90° through 150°.

* * * * *